March 18, 1930.

A. H. SMITH

CINEMATOGRAPH FILM

Re. 17,625

Original Filed June 18, 1926

Albert Henry Smith
Inv.
By
C. A. Snow & Co. Atty's.

Reissued Mar. 18, 1930

Re. 17,625

UNITED STATES PATENT OFFICE

ALBERT HENRY SMITH, OF BIRMINGHAM, ENGLAND

CINEMATOGRAPH FILM

Original No. 1,674,528, dated June 19, 1928, Serial No. 116,923, filed June 18, 1926, and in Great Britain June 3, 1926. Application for reissue filed May 21, 1929. Serial No. 364,922.

This invention comprises certain improvements in or relating to cinematograph or like films. These films have ordinarily rectangular perforations at intervals along each edge, for meshing with the teeth of feed rollers in the projecting apparatus or the like. The feed rollers are driven intermittently at considerable speed, and consequently the teeth not only press against the edges of the perforations, but also have a snatching action thereon, with the result that the material at the edges of the perforations cracks and tears away. This invention has for its object to obviate this defect and to considerably increase the life of the film.

According to the present improvements, a cinematograph or like film is strengthened on one side on the full length of each edge by a flat strip or ribbon of metal which is fixed on or interlocked with the previously perforated film. The strips have tongues cut therefrom which are of a size corresponding to the size of the required perforation in the strip and which are bent through the perforations in the film and folded some around the front edges and some around the rear edges of such perforations, the strip of metal being of such a character and so connected to the film that the film can be wound into a close coil and bent into varying curvatures whilst passing through projecting apparatus or the like. The metal strips are also so connected to the film that creep is prevented. The said tongues of metal are preferably pressed back on the film whilst the film and metal strips are passed around a cylindrical surface. The metal strips may also be of thinner gauge than the film, and such metal strips are preferably located on the outer side of the film.

Referring to the drawings:—

Figure 1:
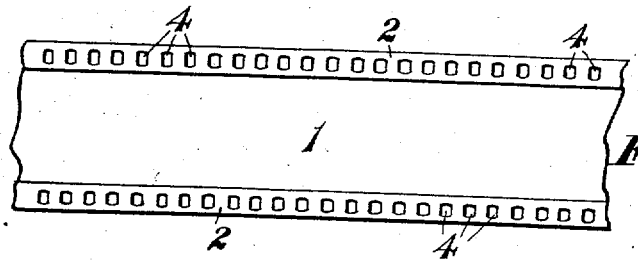
Figure 1 is an outer face view of a portion of a film constructed according to this invention.
Figure 2:
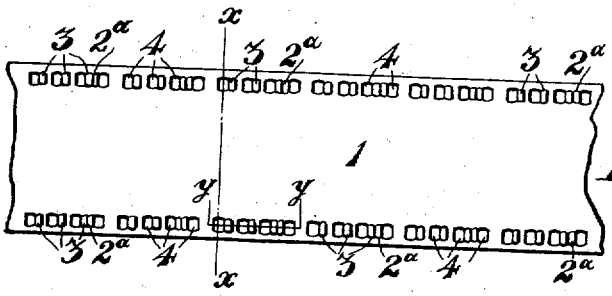
Figure 2 is an inner face view.
Figure 4:
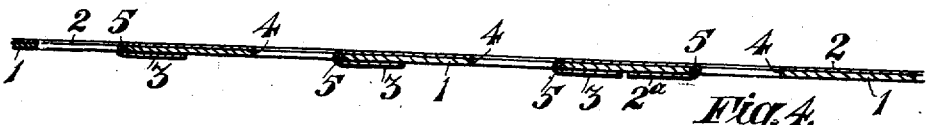
Figure 4 is a longitudinal sectional elevation drawn to an enlarged scale, the section being taken on line *y y* of Figure 2.
Figure 3:
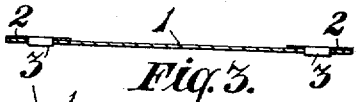
Figure 3 is an enlarged cross sectional view, the section being taken on line *x x* of Figure 2.
Figure 5:
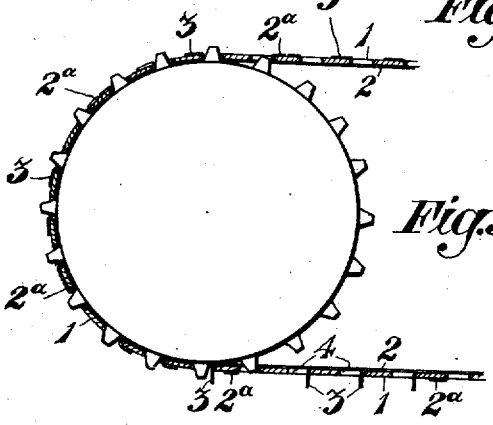
Figure 5 is a view showing the position of the film when the tongues are pressed back on the inner side of the film.

According to a convenient embodiment of this invention, the full length of the film 1 is strengthened on each edge by the metal strips or ribbons 2, located on the outer face of the film. These metal strips have tongues 3 pierced therefrom which are substantially the same size as the perforations in the strip and such tongues are bent around an edge of the perforations 4, and clamped or pressed down on the film, thus forming long, trailing, flexible tongues which lie flat against the surface of the film, and which because of their length and because of their flexibility, flex and bend with the film, but always remain in intimate contact therewith. The film is required to be wound into a close coil and to pass around surfaces having various curvatures, and also to move in a straight path. As the metal strip is positioned on the outer face of the film the length of metal strip passing round a curved portion of the film will vary slightly from the length of metal strip lying on a correspondingly straight portion of the film, and therefore a slight movement between the film and metal strip is provided for, whilst at the same time the metal strips are prevented from creeping bodily in relation to the film. The metal tongues 3 for this purpose are preferably pressed around the edges of the perforations in such a manner that a small space 5 is left between the edge of the perforation and the inside of the tongue. To prevent the strips creeping bodily some tongues are bent forwardly and some tongues $2^a$ are bent rearwardly. When the film is passing through the "gate" of the projecting machine the edges of the tongues 3 are rearwardly directed, whilst the edges of the tongues $2^a$ are forwardly directed. The tongues $2^a$ are therefore more liable to be lifted, but this liability is prevented by the protection afforded by the tongues 3 which protect the edges of the tongues $2^a$. The tongues are pressed back on the film whilst the film and metal strips are bent round a cylindrical surface as shown by Figure 5. In order to give sufficient flexibility to the metal strips so that the film is not damaged in use such metal strip is of a thinner gauge than the film and for ordinary films at present in use the metal strips are conveniently three thousandths of an inch thick and formed of phosphor or other bronze or other metal which can be rolled or formed into thin strips, and possesses the required flexibility and strength. The flexibility of such strips between the points of attachment also allows a slight movement to take place between the strips and the film to enable the strengthened film to take up any curvature in use. The physical properties of the phosphor or like bronze strips are such that the tongues can be bent to lie close against the film and are not liable to be lifted during the coiling and recoiling in the passage through the apparatus. Again the reliability and strength of the metal enables the strips to remain attached to the film without damage to the film and without applying tearing strains thereon.

The life of a film thus reinforced will be considerably lengthened, as the life of a film has heretofore usually been governed by the damage received at the edges of the perforations. The metal ribbon also protects the face of the film from scratches, whilst moreover the liability of the film being broken is reduced to a minimum. The edges of the film will be prevented from fraying and liability of the film catching fire is considerably minimized.

I claim as my invention:

1. In a device of the class described, a film having driving wheel perforations arranged in a longitudinal line adjacent to one edge of the film, and a reinforcing strip on one surface of the film and extended longitudinally of the film, the strip being provided with perforations registering with the perforations of the film, the material freed in the formation of the perforations of the strip being fashioned into tongues which are extended through the perforations of the film and overlapped on the opposite surface of the film, spaced pairs of adjoining tongues being extended toward each other in opposite directions, and all of the tongues intervening between the said pairs projecting in one direction, the edge of the perforation in the strip that is opposite to each of said intervening tongues being plain.

2. The combination with a cinematograph film having driving wheel perforations arranged in a longitudinal line adjacent the edge of the film, of a continuous reinforcing strip extending longitudinally of the film having perforations registering with the perforations in the film, tongues secured to said reinforcing strip at the transverse edges of said perforations, said tongues being substantially the same length as said perforations and being bent around the adjacent transverse edge of the film perforation to form long trailing flexible holding members for securing the reinforcing strip to the film.

3. The combination with a cinematograph film having driving wheel perforations arranged in a longitudinal line adjacent the edge of the film, of a continuous reinforcing strip extending longitudinally of the film having a succession of perforations registering with the perforations in the film, the material punched from said reinforcing strip to form each of said perforations forming a single tongue secured to a transverse edge of the respective perforations, said tongue being bent around the adjacent transverse edge of the film perforation to hold said reinforcing strip to the film.

4. A cinematograph film having driving wheel perforations therein, and a continuous reinforcing strip of flexible material having registering perforations therein, said reinforcing strip being secured to said film by means of a multiplicity of trailing tongues formed integrally with said strip, said tongues being substantially the same length as said perforations.

5. A cinematograph film having driving wheel perforations therein, and a continuous reinforcing strip of flexible material having registering perforations therein, said reinforcing strip being secured to said film by means of a multiplicity of trailing tongues formed integrally with said strip, said tongues being punched from said strip in forming said perforations and being substantially the same length as said perforations.

6. The combination with a cinematograph film having driving wheel perforations arranged in a longitudinal line adjacent the edge of the film, of a continuous reinforcing strip extending longitudinally of the film having perforations registering with the perforations in the film, tongues secured to said reinforcing strip at the transverse edges of said perforations, said tongues being substantially the same length as said perforations and being bent around the adjacent transverse edge of the film perforation to form long trailing flexible holding members for securing the reinforcing strip to the film, and means to prevent creeping of said strips with respect to said films.

7. A cinematograph film having driving wheel perforations therein, a continuous reinforcing strip of flexible material having registering perforations therein, said reinforcing strip being secured to said film by means of trailing tongues formed integrally with said strip, said tongues being substantially the same length as said perforations, and means to prevent creeping of said strips with respect to said films.

8. The combination with a cinematograph film having driving wheel perforations arranged in a longitudinal line adjacent the edge of the film, of a continuous reinforcing strip extending longitudinally of the film having perforations registering with the perforations in the film, tongues secured to said reinforcing strip at the transverse edges of said perforations, said tongues being substantially the same length as said perforations and being bent around the adjacent transverse edge of the film perforation to form long trailing flexible holding members for securing the reinforcing strip to the film, and additional similar oppositely directed tongues to prevent creeping of said strips with respect to said films.

9. A cinematograph film having driving wheel perforations therein, a continuous reinforcing strip of flexible material having registering perforations therein, said reinforcing strip being secured to said film by means of trailing tongues formed integrally with said strip, said tongues being substantially the same length as said perforations, and additional similar oppositely directed tongues to prevent creeping of said strips with respect to said films.

10. A cinematograph film having driving wheel perforations therein, a reinforcing strip of flexible material having registering perforations therein, said reinforcing strip being secured to said film by means of trailing tongues formed integrally with said strip, said tongues being substantially the same length as said perforations, and additional oppositely directed tongues to prevent creeping of said strips with respect to said films, the facing ends of said oppositely directed tongues standing behind and in position to be protected by the ends of said trailing tongues.

11. A cinematograph film having driving wheel perforations therein, and a continuous reinforcing strip of flexible material having registering perforations therein, said reinforcing strip being secured to said film by means of trailing flexible tongues which lie flat against the surface of the film and flex and bend therewith.

In testimony whereof, I have signed my name to this specification this 16th day of May, 1929.

ALBERT HENRY SMITH.